Figure 1:
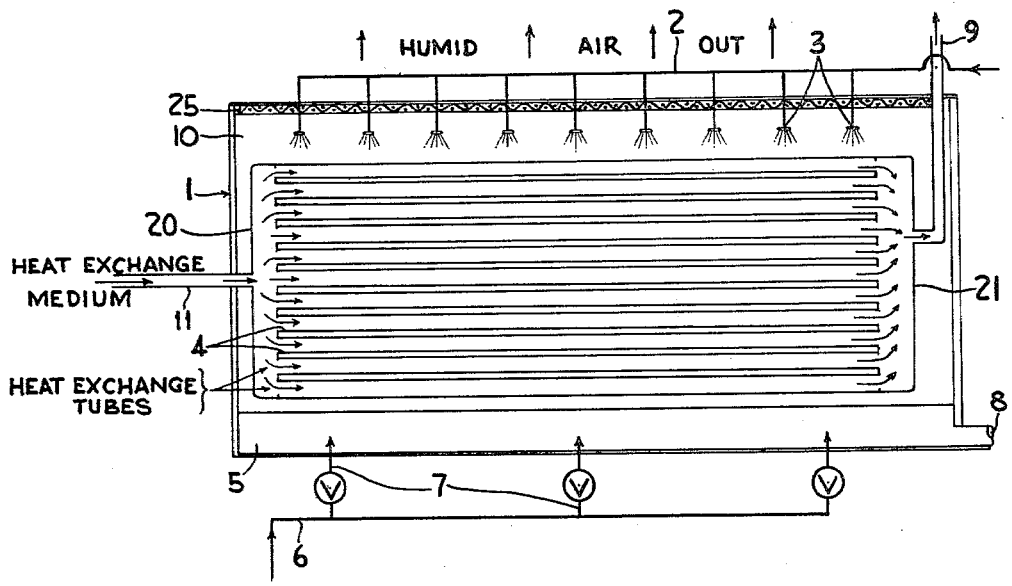

INVENTOR.
KENT E. HATFIELD
BY
*Oscar L. Spencer*
ATTORNEY 3,195,614
PROCESS OF CONCENTRATING SOLUTIONS OF SODIUM AND POTASSIUM CHLORIDE AS FALLING FILMS ON HEATED SURFACES
Kent E. Hatfield, Corpus Christi, Tex., assignor to Pittsburgh Plate Glass Company, Pittsburgh, Pa., a corporation of Pennsylvania
Filed Dec. 1, 1961, Ser. No. 156,263
4 Claims. (Cl. 159—49)

This invention relates to concentrating aqueous solutions containing potassium chloride. More particularly, this invention relates to concentrating brine containing potassium chloride and sodium chloride by the evaporation of water therefrom so that the solutions may be further treated to remove potassium chloride values.

Potassium chloride as obtained from ores is typically isolated therefrom by effecting a solution of the ore and crystallizing or precipitating, or extracting out the potassium chloride values. Such ores as obtained by shaft mining of a potassium chloride containing deposit require the crushing or grinding of the ore with a heated mother liquor or a leaching solution, typically followed by cooling the resulting brine to crystallize and separate the potassium chloride therefrom. The residual mother liquor is used in a fresh dissolving step with a further batch of ore. On the other hand, when the potassium chloride containing ore is mined by solution techniques there is obtained from the deposit an aqueous solution substantially saturated with potassium chloride and sodium chloride as well as other salts, for example, magnesium sulphate, potassium sulphate, etc. Removal of the potassium chloride values from the solution can be accomplished by the method discussed above though such separation of the potassium chloride may also be achieved by flash cooling the solution so that potassium chloride having a low degree of solubility at the temperature of cooling is precipitated while the other salts are retained in solution.

These various techniques for isolating potassium chloride from an aqueous solution saturated therewith are fairly costly and time consuming and in order to obtain high yields of KCl it is desirable to remove large quantities of water from the solution. Pre-evaporation techniques are contemplated to help reduce the cost of water removal, but they have not heretofore appeared satisfactory. A serious corrosion and heat transfer problem in pre-evaporation results from deposition of salt on the pre-evaporator causing fouling of the pre-evaporator. Also, loss of product potassium chloride with waste salt due to premature cooling of the solution during pre-evaporation is a constant problem which heretofore made such techniques commercially unattractive.

It has been found that these difficulties can be substantially minimized, and in most cases totally obviated, by the process of this invention.

This invention relates to concentrating an aqueous solution containing KCl and NaCl by contacting the solution below its boiling temperature with a sweep gas stream whereby to remove water from the solution while simultaneously introducing sufficient heat into the solution to prevent crystallization of solid KCl. Preferably, a thin film of the solution is passed over a heated surface as it is contacted with the sweep gas stream.

It has been discovered that pre-evaporation, i.e., increasing the percent solids (by weight) of an aqueous solution typically containing from 8 to 24 percent by weight of KCl and 8 to 17.5 percent by weight of NaCl can be simply and effectively achieved by flowing the solution at a temperature below about 120° C., typically above 35° C., over a heated tube in pre-evaporator having a temperature above about 35° C., preferably from 40° C. to 100° C., while simultaneously contacting the solution at the tube surface with a stream of air.

When the amount of said air employed to the amount of solution flowing over the heated tube is sufficient to hold the temperature of the solution above about 35° C., the resulting slurry is found to have a KCl content in excess of 12, up to 24 percent by weight of the slurry and an NaCl content in excess of 20 percent by weight of the slurry. Most important, it is found that little or no deposit of salt is to be found on the heated tubes, and KCl is not crystallized from solution.

The temperature of the air stream may range from 0° C. to 100° C. or more, though typically ambient temperatures (e.g., 25° C.) are employed.

Though air has been specified above, any gas inert to the salts in the solution under the operating conditions may be similarly employed. Typical examples of such gases include spent stack gases, nitrogen, argon and carbon dioxide. Preferably, the gases are unsaturated as to water content. Typically, the relative humidity of the gas is less than 99 percent, preferably below 90 percent. Thus, air having a relative humidity of less than 90 percent is most effective.

The heated tubes may be brought to their desired temperature by the use of any heat exchange medium. Examples of usable medium are heated air, steam, mixtures of these two, KCl-NaCl brine solution, glycerine or a mixture of diphenyl and diphenyl oxide (Dowtherm).

FIGURE 1 diagrammatically illustrates an apparatus in which the process hereinabove discussed may be carried out.

Heat exchange medium is introduced through line 11, having a temperature of from 35 to 120° C., to header 20 and then through tubes 4 in pre-evaporator 1. The heat exchange medium is then removed from pre-evaporator 1 via header 21 and then through tube 9. Evaporator 1 is typically a rectangular steel tank. Materials other than steel may be employed, notably synthetic plastics. Heat exchange tubes 4 are generally made of brass and may have a variety of diameters. Above heat exchange tubes 4 are positioned a plurality of spray heads 3 connected to a common header 2 through which is passed the solution to pre-evaporator 1. Openly connected to the interior of the pre-evaporator is space 10 across which is fitted metal mesh 25, which serves to collect solution entrained in the gas leaving the pre-evaporator.

Below heat exchange tubes 4 is sump 5 which serves as a collection point for the slurry. The slurry is removed therefrom through port 8. In most cases, the bottom of sump 5 is downwardly inclined toward outlet 8 to assist slurry removal. Associated with sump 5 and on one side thereof are pipes 7 connected to common header 6 and through which is passed air.

Figure 2:
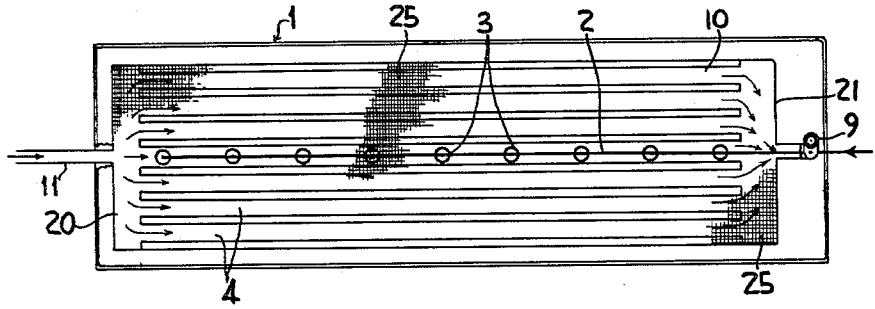

FIGURE 2 diagrammatically depicts a top view of a modified version of the apparatus of FIGURE 1. It differs from the apparatus of FIGURE 1 in that there are a plurality of heat exchange tubes 4 horizontally disposed in pre-evaporator 1 and lined up in parallel. The pipes are fed heat exchange medium from header 20. The top view of FIGURE 2 illustrates that the upper portion, space 10, of pre-evaporator 1 opens to the atmosphere. It further illustrates the disposition of wire mesh 25 across space 10 and the central location of spray heads 3.

In the preferred operation of the aforementioned apparatus, 20 to 150 gallons per minute solution is added to the pre-evaporator for every square foot of pre-evaporator cross-sectional area determined perpendicular to the flow (e.g., the interior cross-sectional area of pre-evaporator 1 of FIGURE 2), and the amount of air added is from 5 to 35 cubic feet per minute per square foot of this cross-sectional area. Under these conditions, it is found that the optimum water removal is achieved without substantial change to the temperature of the solution while preventing deposition of the salt on the heat exchange pipes.

The following example serves to illustrate a specific operation of the process described above.

EXAMPLE

The pre-evaporator employed in this example has a structure very similar to that described in FIGURES 1 and 2. The interior dimensions of the sheet metal, rectangular pre-evaporator are 18 inches wide by 40 inches high by 12 feet long. In the pre-evaporator is centrally disposed 77—1½ inch brass tubes, each 12 feet long. They are laid out on 2¾ inch triangular pitch so that the pipes are bundled in threes in a triangular arrangement. The bundles are laid out in 17 parallel and horizontal rows, alternating 5 and 4 bundles in each of the rows. Each bundle is positioned so that it is not directly below a bundle in the row above. The evaporator contains 360 square feet of the tube surface.

A vapor disengaging section open to the atmosphere is provided directly over the tube bundle. This houses 12 evenly spaced and centrally disposed spray nozzles that distribute the solution over the tubes. The disengaging section is 18 inches wide by 18 inches high by 144 inches long. A mesh demister made of stainless steel wire forming a porous pad is placed over the top of this section so as to completely enclose it. The demister serves to remove vaporous salt solution carried off by the air stream. Each of the spray nozzles are connected to a common header located above the disengaging section that carries the solution to the spray nozzles.

A slurry sump is located at the bottom of the evaporating unit. This provides a collection space for the concentrated solution as well as helping to distribute the incoming dry air which enters the pre-evaporator by way of 3 evenly spaced openings in one side of the sump. The sump is directly connected to the pre-evaporator and opens thereto. It is 10 inches wide at the bottom and slopes 1 inch per foot in the direction of the slurry flow to an outlet at one end of the sump. The length of the sump is equivalent to the length of the pre-evaporator and the sides are inclined to make contact with the walls of the pre-evaporator.

To bring the heat exchange tubes to the desired temperature, saturated steam at 140 pounds per square inch gauge was reduced to atmospheric pressure and mixed with air supplied by a positive displacing blower, and the mixture was passed to the tubes from a common header. The cool gases leaving the pre-evaporator tubes were collected in a common header and vented to the atmosphere.

The following table illustrates the summary of the operating variables and the results of a portion of runs with the above apparatus.

change tubes. If cooling were to take place, KCl would crystallize out of the solution.

Process streams that pass through the pre-evaporator are of such a composition that solid sodium chloride crystals are formed during the evaporation. Potassium chloride is maintained in solution by preventing cooling of the solution. Since the evaporation takes place at the air-liquid interface, the most concentrated solution will be at the liquid surface. Hence, the majority of crystal formation will also take place at the liquid surface. This technique makes it possible to avoid much of the tube fouling that occurs in normal evaporators where the evaporation takes place on the tube surface.

Preferably, the heated surface over which the flowing film is passed, is a tube, as described above, though the surface may take other shapes. Thus, the solution may be flowed in the form of a thin film over a heated plate or rectangular internally heated bar while simultaneously contacted with a stream of inert gas. Another method which may be employed, though not as effective as the above methods, involves placing the solution in a heated tank and passing the inert gas over the solution surface to remove water. It is desirable that the solution in the tank have a shallow depth, e.g., not greater than 6 inches. In this embodiment, a hydrostatic head should be placed on the incoming solution. This will serve to minimize salt deposition.

Ideally, a flowing film of solution having a thickness not exceeding 6 inches, preferably less than 1 inch, is concurrently contacted while on a heated surface with a stream of inert gas unsaturated as to water. The temperature of the surface should be high enough to prevent crystallization of KCl out of the solution and the amount of inert gas to the quantity of solution should be sufficient to prevent salt incrustation (KCl or NaCl, particularly NaCl) on the heated surface.

The process of this invention can also be employed for purification of water containing salts, such as sodium chloride and potassium chloride. Thus, the water vapor removed from the salt solution with the air stream can be cooled to condense the vapor and produce drinking water of high purity.

Although the present invention has been described with reference to specific details of certain embodiments thereof, it is not intended that such details should be regarded as limitations upon the scope of the invention except when they are included in the accompanying claims.

I claim:

1. The process of concentrating an aqueous solution of sodium chloride and potassium chloride to obtain a solution having a higher concentration of potassium chloride which comprises, contacting said solution of sodium chloride and potassium chloride with a heated solid surface maintained Table.—A summary of the operating variables and results of runs

| Runs | KCl solution feed, gallons per minute | Steam rate to heat exchange tubes, lbs./hr. | Total air and steam velocity to evaporator tubes, ft./sec. | Gas into tubes, °C. | Gas out of tubes, °C. | Liquor In, °C. | Liquor Out, °C. | Heat transferred in evaporator 10⁶ B.t.u./hr. | Water evaporated from liquor, lbs./hr. | Air rate into preevaporator in standard cubic ft./minute | Average heat coefficient, B.t.u./hr. ft.²–°F. |
|---|---|---|---|---|---|---|---|---|---|---|---|
| 1 | 45 | 1,660 | 23.0 | 93 | 64 | 50 | 52.8 | 1.512 | 1,253 | 4,880 | 99.6 |
| 2 | 87 | 1,660 | 23.0 | 93.3 | 70.5 | 49.5 | 52 | 1.488 | 1,319 | 5,250 | 78.8 |
| 3 | 90 | 1,660 | 23.0 | 93.3 | 70.5 | 51.7 | 54 | 1.492 | 1,330 | 3,760 | 84.9 |
| 4 | 48 | 1,200 | 23.0 | 81 | 60 | 54.4 | 52.8 | 0.477 | 324 | 1,280 | 49.6 |
| 5 | 79 | 1,660 | 23.0 | 92 | 69 | 54 | 54 | 1.451 | 1,317 | 3,910 | 85.2 |

After each of these runs, the evaporator was inspected and it was found that no salt deposits existed in the evaporator.

The theory behind the success of this process is not altogether understood, but it is felt that when the partial vapor pressure of the water is reduced by countercurrent sweeping with air, instead of cooling the solution, its temperature is held constant by virtue of the hot heat exchange at a temperature lower than the boiling temperature of said solution of sodium chloride and potassium chloride to heat said solution of sodium chloride and potassium chloride to a temperature above that at which potassium chloride precipitates to avoid precipitation of potassium chloride from said solution and to release water vapor at the exposed surface of said solution, contacting the surface of said solution of sodium chloride and potassium chloride on said heated surface with a sweep gas to remove water vapor therefrom and concentrate said solution in the region adjacent the interface between said gas and said solution to precipitate sodium chloride in said concentrated region of said solution while keeping sodium chloride in solution at the interface between said solution and said heated solid surface, and recovering a solution having a higher concentration of dissolved potassium chloride than that of said starting solution.

2. The process of claim 1 wherein the said aqueous solution contacted with said heated solid surface is in film form.

3. The process of claim 1 wherein said solution is maintained at a temperature between 35 to 120° C.

4. The process of claim 1 wherein the feed temperature of said gas stream is from 0 to 100° C. and the relative humidity of the gas stream is below 90 percent.

References Cited by the Examiner

UNITED STATES PATENTS

| | | | |
|---|---|---|---|
| 546,530 | 9/95 | Haubtman | 159—13 |
| 573,219 | 12/96 | Haubtman | 159—13 |
| 1,156,388 | 10/15 | Bradburn | 23—298 |
| 1,342,519 | 6/20 | Wheeler | 23—296 |
| 1,863,751 | 6/32 | Kipper | 23—298 X |
| 2,162,158 | 6/39 | Coey. | |
| 2,222,561 | 11/40 | Downs et al. | 159—13 |
| 2,665,124 | 1/54 | Cross | 23—312 X |
| 2,876,833 | 3/59 | Kelley et al. | |

NORMAN YUDKOFF, *Primary Examiner.*

CHARLES O'CONNELL, *Examiner.*